R. L. SMITH.
RIVET OR FASTENER.
APPLICATION FILED JULY 11, 1918.

1,385,799.                                    Patented July 26, 1921.

Attest.
Charles A. Becker.

Inventor
Raphael L. Smith,
Rippey & Kingsland,
By his Attorneys.

UNITED STATES PATENT OFFICE.

RAPHAEL L. SMITH, OF ST. LOUIS, MISSOURI.

RIVET OR FASTENER.

1,385,799.

Specification of Letters Patent.   Patented July 26, 1921.

Application filed July 11, 1918.   Serial No. 244,384.

*To all whom it may concern:*

Be it known that I, RAPHAEL L. SMITH, a citizen of the United States, residing at the city of St. Louis and State of Missouri, have invented a new and useful Rivet or Fastener, of which the following is a specification.

This invention relates to rivets or fasteners.

An object of the invention is to provide a rivet or fastener having a head on one end and which, for a portion of its length from the head is of very hard material so that it cannot be readily cut or removed by drill or other implement, and which for the remaining portion of its length is of softer character so that it may be hammered or pressed to form another head or enlargement to bind the rivet in position.

Another object of the invention is to provide a rivet or fastener having a head on one end and which, for a portion of its length from the head is of very hard material and having threads on said hard portion adapted to be screwed into a threaded hole in one or more of the elements which are to be fastened together, and which for the remaining portion of its length is of softer character so that it may be hammered or pressed to form another head or enlargement to bind the rivet in position.

Another object of the invention is to produce a fastener which is provided with screw threads for a portion of its length and having a smooth, uncurved and unslotted head on the end from which the threads extend, and a portion of smaller diameter than the threaded portion extending from the opposite ends of the threaded portion and adapted to be hammered or pressed to form a head to retain the fastener in position.

Other objects will appear from the accompanying drawing, without specific mention thereof.

In the drawing Figure 1 is a sectional view of two elements fastened together by my improved rivets or fasteners, the soft portion of one of which has been hammered or pressed into finished form, while the soft portion of the other one of the rivets or fasteners has not been hammered or pressed.

Figure 1:
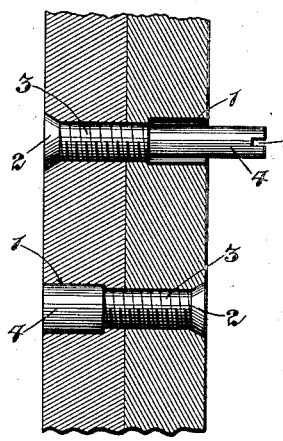
Figure 2:
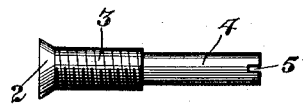
Fig. 2 is a view of one of the rivets or fasteners detached.

As illustrated in Fig. 1 there are two elements fastened together by rivets or fasteners inserted from opposite sides. As shown in Fig. 1, each of the elements which are fastened together is provided with a threaded hole extending entirely therethrough and is also provided with a threaded hole extending only a part of the way therethrough and opening into a hole 1 of larger diameter and preferably in axial alinement with the threaded hole. The outer end of each of the threaded holes which extend all the way through the elements are preferably countersunk in order to receive the heads of the fasteners, since it is desirable in some instances to have the surfaces of the heads of the rivets flush or even with the surfaces of the elements which are fastened together thereby.

As shown each fastener comprises a head 2 and a threaded portion 3 extending for a desired distance from the head and arranged to screw into the threaded holes in the element or elements to be fastened together thereby. As shown in Fig. 1 the threaded portion of the fastener is of equal length with the depth or length of the threaded holes in the elements which are fastened together, and from the end of the threaded portion of the fastener a portion 4 of reduced diameter extends. The purpose in making the portion 4 of less diameter than the portion 3 is to permit said portion 4 to pass freely through the threaded holes without interference with the threads. Preferably in its initial form the end of the portion 4 is provided with a notch or groove 5 for receiving a screw driver by which the fastener may be screwed tightly to position to bind the two elements closely together.

The head 2 of the fastener is composed of very hard material and in order to give the fastener this characteristic or quality the head may be case hardened and, if desired, the threaded portion 3 may also be case hardened. However, in mentioning case hardened for the head, I do not confine myself to that feature, since the desired result or quality of hardness may be otherwise attained. The extended portion 4 is softer than the head 2 so that after the fastener has been placed in position, as shown at the upper part of Fig. 1, the portion 4 may be hammered or pressed in order completely to fill the enlarged hole or recess 1, as will be readily understood from the drawing.

In fastening elements together by use of my improved rivets they are preferably inserted from opposite sides of the elements as shown, so that the heads 2, which are so hard that they cannot easily be cut or drilled in order to remove the fasteners, are on alternately opposite sides of the fastened elements; while the softer heads formed by hammering or pressing the portions 4 are also on opposite sides of the elements. Since the threaded portions 3 are also preferably of hard material, so that they cannot be drilled out of the holes in which they are placed except by long and painstaking physical work and effort, it is quite apparent that it is nearly impossible to remove the fasteners and separate the fastened elements. Thus even though the softer heads formed by the portions 4 be drilled out, the screws 3 will remain and securely hold the fastened elements together, it being impossible to engage the heads of the screws by a screw driver or other implement.

Figure 3:
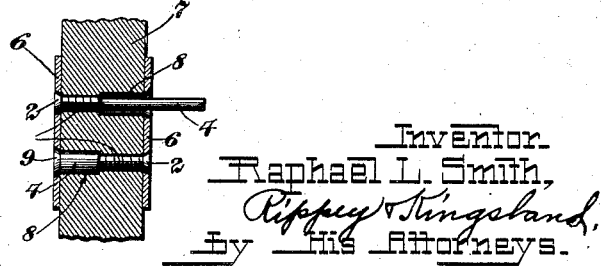
Fig. 3 is a view illustrating the two elements fastened to a third or intermediate one by means of my improved rivets or fasteners.

As shown in Fig. 3, two relatively thin elements 6 are fastened to a third or intermediate element 7. In this instance the intermediate element 7 is provided with a number of holes having enlarged portions 8 extending inwardly from alternate opposite sides of said element and smaller threaded holes in continuation of the holes 8 extending also from alternately opposite sides of the element 7 in order to receive the threaded portions of the fasteners.

The elements 6 are provided with countersunk holes adapted to receive the heads 2 of the fasteners and also to receive heads 9 formed by hammering or pressing the softer portions 4 of the fasteners. By fastening the elements 6 to the intermediate element 7 in this way, it is quite clear that it is impossible to remove or detach either of the elements 6, since all of the fasteners cannot be separated from either one of said elements 6.

It is apparent that fasteners of this kind are adapted for a variety of uses as, for instance, in securing together the different parts of lock mechanisms. I do not restrict myself to any specific use of the invention, nor to the identical construction illustrated and described, but include within the scope of the appended claims all equivalent structures.

I claim:

1. Elements adapted to be fastened together having holes therethrough, and threads in the hole in one of said elements, in combination with a fastener composed of a non-malleable portion having threads thereon screwed into the threads in said hole in one of said elements, and a non-malleable head on said fastener engaging the other element and binding said two elements together, and being incapable of engagement by a manipulating tool and also being incapable of being cut or drilled by the usual cutting and drilling devices.

2. A rivet or fastener, composed of a malleable portion adapted to be hammered or pressed to form a head or enlargement after the rivet or fastener has been placed in position, and a non-malleable portion having a non-malleable head at one end thereof, extending from one end of the malleable portion, said non-malleable portion and head being incapable of being cut or drilled by the usual cutting and drilling devices.

3. Elements adapted to be fastened together having holes therethrough threaded for a portion of their length, in combination with fasteners threaded for a portion of their length screwed into the threaded portion of said holes and enlarged to fill the remaining portions of the holes after being placed in position.

RAPHAEL L. SMITH.